Figure 1:
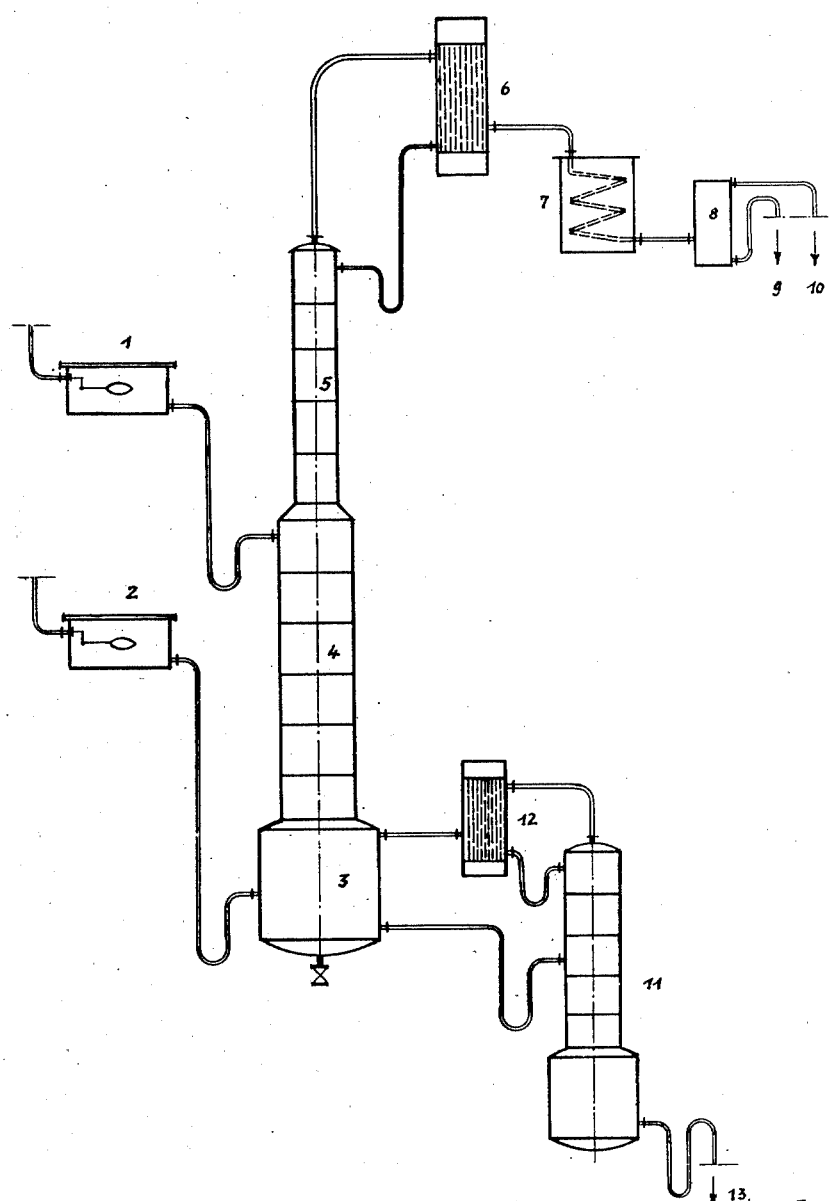

April 25, 1939.  E. VON RETZE  2,155,625
PRODUCTION OF ORGANIC ESTERS
Filed Dec. 24, 1935   3 Sheets-Sheet 1

Inventor:
Ewald Von Retze
By
Attorney

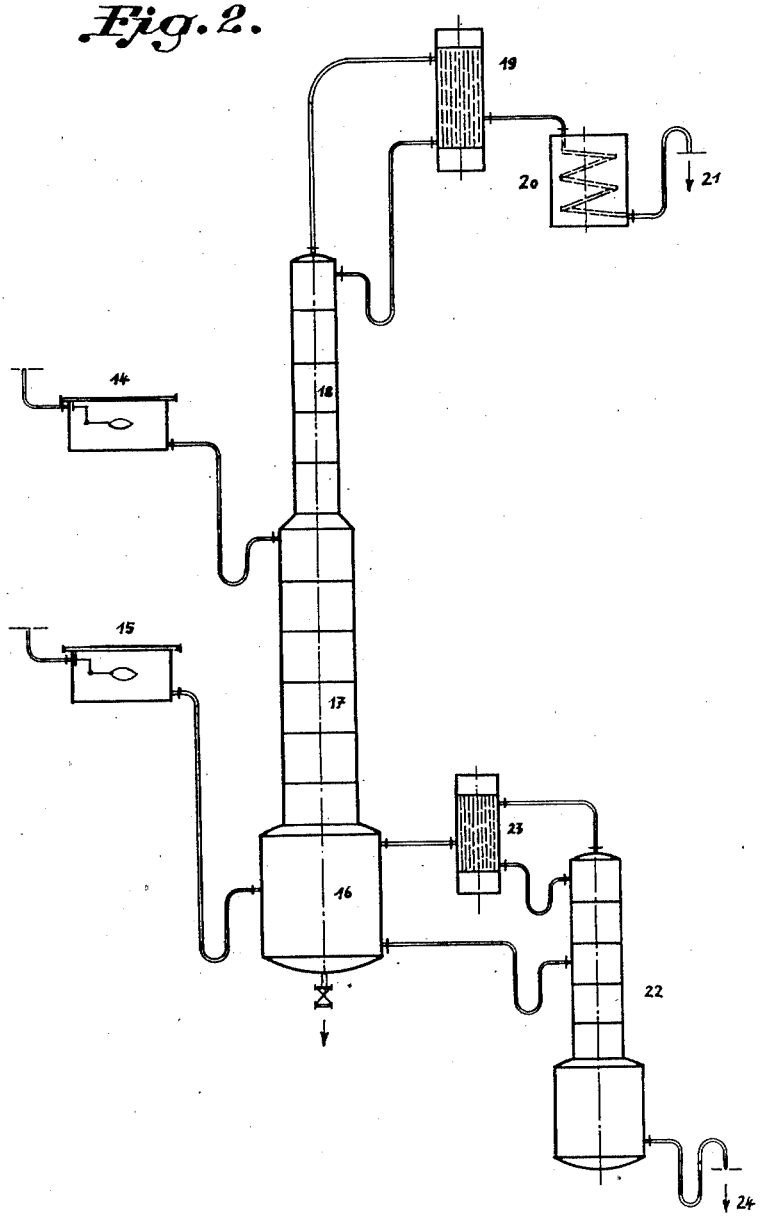

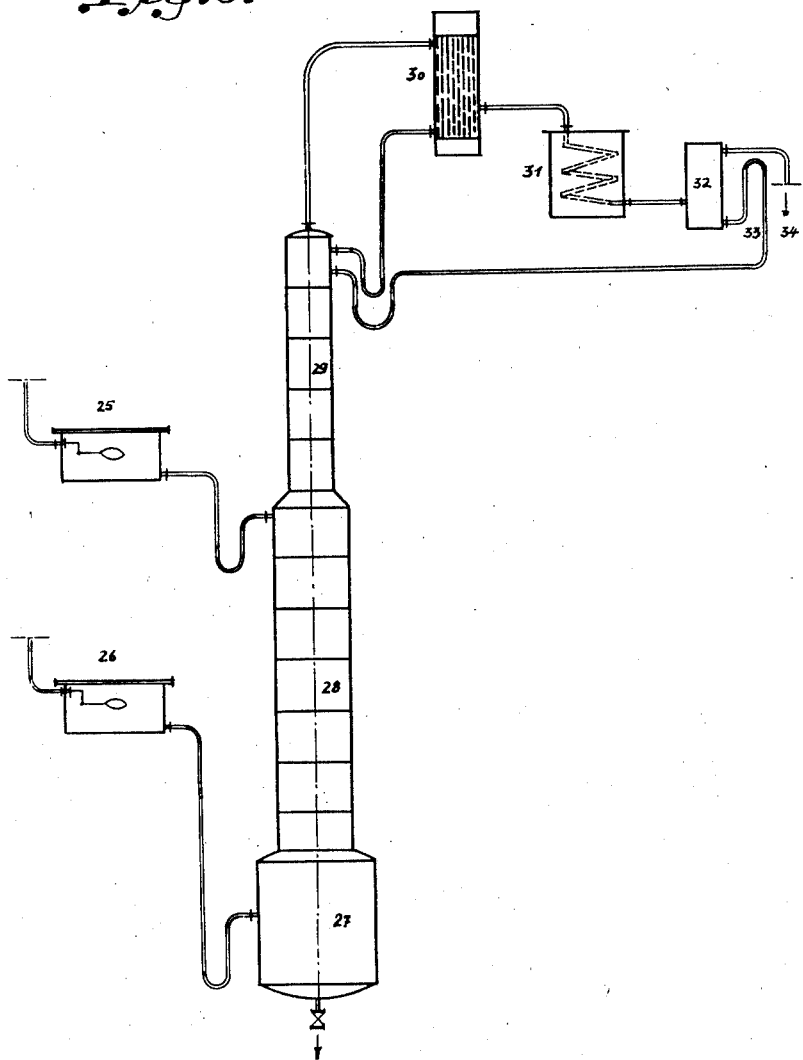

Patented Apr. 25, 1939

2,155,625

UNITED STATES PATENT OFFICE 2,155,625

PRODUCTION OF ORGANIC ESTERS

Ewald von Retze, Schonberg, near Kronberg, Germany, assignor to Deutsche Gold- und Silber-Scheideanstalt, Frankfort-on-the-Main, Germany, a corporation of Germany Application December 24, 1935, Serial No. 55,961

13 Claims. (Cl. 260—488)

The present invention relates to the production of organic volatile esters. A feature of this invention consists in preparing esters in a most simple and efficient manner. A further feature is to provide esters in high concentration with excellent yields and with a minimum amount of costs. Further features will be derived from the following description:

The present invention relates to the production of esters from the series of methylalcohol, ethylalcohol, the 2 propylalcohols, the different butylalcohols, amylalcohols and their homologues in combination with formic-acid, acetic-acid, propionic-acid, the different butyric-acids, valerianic-acid and their homologues. Instead of the above mentioned alcohols polyhydric-alcohols, derivatives or mixtures may also be used. Instead of the mentioned fatty acids their hydroxy-derivatives—i. e., lactic acid—or other derivatives and mixtures thereof may be used.

It is known to produce esters by heating alcohol together with organic acids, in the presence of sulfuric-acid or like catalysts. Nevertheless the esters obtained contain free alcohol forming so called azeotropic mixtures. The separation of the unconverted alcohol from these mixtures is quite difficult and entails undesirable costs.

It was therefore suggested to react alcohols in the presence of the greatest possible practical excess of the acid to be esterified, in order to enhance the velocity of esterification. In spite of the fact that by this manner alcohol-free esters may be obtained this method is objectionable, for it requires immense esterification vessels due to the fact that the output is lowered by the low percentage of alcohol.

The present invention avoids all these difficulties; according to the present process an esterification mixture consisting of e. g. equal molecules of acid and alcohol are heated together in a reaction vessel. The vapors evolved thereby which consist generally of ternary azeotropic mixtures are passed into a washing column. Into this washing column the organic acid to be esterified is introduced in the liquid state. When the liquid acid passes down the column it extracts readily any unconverted alcohol. In this manner a solution of free alcohol in the liquid organic acid is formed which is passed back to the esterification vessel. Further quantities of alcohol, which are necessary for the esterification may be introduced into the esterification vessel.

The vapors passing to the upper part of the washing column are substantially free from any unconverted alcohol. In order to prevent any free acid from distilling over together with the ester I prefer to pass the vapors through a supplemental column.

The vapors obtained consist of pure esters besides some water. The elimination of the water may easily be performed in a manner known per se.

To that end the water containing ester may be treated with anhydrous calcium-chloride, sodium-sulfate or their concentrated aqueous solutions as well as aluminia, silica-gel and the like. On the other hand the elimination of water may be performed by azeotropic distillation. In this way the water containing ester is introduced into a column still and distilled. The distillate obtained includes the greater part of water and separates generally into 2 layers. The upper layer rich in ester is returned to the column whilst the layer rich in water is first heated to recover ester and finally discarded. A distillation residue from the column still is drawn off and consists of high degree ester.

The esterification mixture may be heated in the presence of catalysts like sulfuric-acid, hydrochloric-acid, zinc-chloride, phosphoric-acid, benzene-sulfonic-acid and the like. The esterification may also be performed by working under super-atmospheric pressure say 2–10 atmospheres.

The fact that increasing pressure produces generally azeotropic mixtures with increasing amounts of water procures an efficient manner to enhance the water entraining effect only by working under higher pressure.

In performing the invention I prefer to use a vessel and connected thereto a washing column. The washing column is preferably packed with Raschig-rings or the like. Column stills provided with plates and caps or sieves may also be used.

The esterification components, that is the organic acid and the alcohol, are brought into the vessel. Little quantities of sulfuric-acid may be added. The content of the vessel is heated to boiling and the vapors escaped are passed into the annexed washing column. The process is then continued by feeding the corresponding alcohol into the vessel. This feeding may be done periodically or with preference continuously. At the same time the organic acid to be esterified, in the liquid state is introduced into the washing column and passes down that column extracting any free alcohol from the ascending vaporous mixture. The descending liquid acid containing free alcohol in solution is passed back to the esterification vessel. The introducing of liquid acid is preferably performed in a continuous manner.

The composition of the alcohol and the organic acid reacted in the vessel is preferably kept corresponding to the acid- and alcohol-values contained in the evolved vaporous mixture. Nevertheless the above mentioned composition may differ to some extent from said proportion. Especially when working continuously I prefer to introduce alcohol and acid in equimolecular quantities.

The vapors ascending the washing column which are freed from unreacted alcohol may contain some vaporous acid. In order to prevent this acid from distilling over together with the vaporous ester, the vaporous mixture is passed through a supplemental column. By condensing this vapor a liquid is obtained which contains pure ester besides some water. The latter may easily be eliminated in the above described manners.

In cases, when the quantity of organic acid is not sufficient to extract all free alcohol from the vaporous mixture, high boiling solvents may be added to the organic acid. High boiling liquids which are not affected under esterification conditions are suited for the purpose, e. g. high boiling alcohols, esters, hydrocarbons, halogenated hydrocarbons, etc. In general increasing quantities of water are collected in the esterification vessel when preparing esters containing not more than a total of 6 carbon atoms in the molecule. This is particularly true when preparing methyl acetate and ethyl acetate. The lower esters are unable to entrain all of the water which is produced by the esterification process even when supplying anhydrous starting material. For that purpose I prefer to draw off periodically or continuously part of the liquid esterification mixture; especially when working with excessive quantities of alcohol it is preferable to pass continuously part of the liquid mixture, containing an excess of alcohol through a dealcoholizing column. In this way the alcohol is recovered and returned to the vessel, whilst the exhausted residue is discarded.

I do not wish to limit myself to the above mentioned description which is only given by way of illustrations.

Example 1

The production of ethyl-acetate may be described by way of example according to Figure 1. In this drawing 3 denotes the esterification vessel. At the beginning of the process a mixture of acetic acid, 1-2% of sulfuric-acid and an excess of ethyl-alcohol is brought into this vessel. Further quantities of ethyl-alcohol are continuously fed into vessel 3 from storage tank 2. The inflow of alcohol is regulated by a regulating valve or devices. Vessel 3 is provided with a heating device. The vaporous mixture formed in 3 passes into the washing column 4 and afterwards into the supplemental column 5. Into the upper section of column 4 concentrated acetic-acid is continuously passed, coming from tank 1. The quantity of acetic-acid is fed in in quantities equivalent to the supplied ethyl-alcohol. The acetic-acid meets the ascending vapors and extracts in this way unconverted ethyl-alcohol from the vaporous mixture. The solution of ethyl-alcohol in acetic-acid passes back into the vessel 3. The vapors coming from the upper part to the dephlegmator 6 are afterwards condensed in the cooler 7. The liquid condensate is brought into the decantator 8 forming therein 2 layers. The upper layer consisting of ethyl-acetate and 3-4% of water is drawn off by tube 10 and finally deprived from water by azeotropic distillation. In this way approximately 100% ethyl-acetate is obtainable. The lower layer consists of water poor in ester. This liquid is drawn off by tube 9 and distilled to recover the rest of ethyl-acetate.

In the course of the esterification water accumulates in the esterification vessel 3; when working continuously I prefer therefore to draw off continuously a part of the esterification mixture from vessel 3. This liquid contains ethyl-alcohol and is conveyed by a necked tube to the dealcoholizing column 11. This column 11 is provided with a dephlegmator 12 and tubes to pass back the recovered alcohol. The effluent water containing a little sulfuric-acid is drawn off by 13. The sulfuric-acid may be recovered. I prefer, however, to discard the residue from 13.

In order to maintain the concentration of sulfuric-acid in the vessel 3 little quantities of fresh sulfuric-acid may be added to 3, together with the alcohol coming from 2.

In an analogous manner ethyl-propionate may be produced.

Example 2

Figure 2 shows an apparatus, which may be used for the production of methyl-acetate. An esterification mixture of acetic-acid, an excess of methyl-alcohol together with ca. 1% of hydrochloric-acid is heated in vessel 16. Further quantities of methyl-alcohol (which may contain some hydrochloric-acid) are continuously supplied to 16 from tank 15. The vaporous mixture escaping from 16, which consists mainly of methyl-acetate and methyl-alcohol, passes into the washing column 17, provided with a supplemental column 18. Acetic-acid in equivalent proportions to the supplied methyl-alcohol is passed from storage tank 14 into the upper part of column 17. The descending liquid consisting of acetic-acid and methyl-alcohol flows back to vessel 16. The vapors arriving at the top of column 18 are passed through a dephlegmator 19, condensed in cooler 20 and drawn off by 21. The methyl-acetate such obtained, contains a little water and may be dried by means of calcium-chloride. The final product is a high percent methyl-acetate free from methyl-alcohol and water.

Part of the liquid contained in 16 is drawn off by a trapped tube and passed into the dealcoholizing column 22. In this way methyl-alcohol is recovered and passed back to the esterification vessel 16 via dephlegmator 23. The exhausted residue consisting of water besides a little hydrochloric-acid is drawn off by 24 and may be discarded.

Methyl-formate or ethyl-formate may be produced in an analogous manner. Instead of using pure acetic-acid any raw-material containing acetic-acid, and coming from the wood-carbonization or from fermentation-process, or acetic-acid-wastes from cellulose-acetate plants may also be used in equal manner.

Example 3

Figure 3 shows by way of illustration an apparatus adapted for the production of butyl-acetate. In the esterification vessel 27 a mixture of butyl-alcohol and glacial acetic-acid is heated in the presence of a little sulfuric-acid. The proportion of butyl-alcohol and acetic-acid is maintained according to the butyl-alcohol- and acetic-acid-values contained in the ternary butyl-alcohol-butyl-acetate-water-mixture. Fresh quantities of butyl-alcohol are passed in continuously and in a regulated manner from a storage tank 26 into vessel 27. The vaporous mixture passing into washing column 28 is extracted by acetic-acid supplied from a storage tank 25 to the upper part of column 28. The vapors are then passed into the supplemental column 29, in order to retain some vaporous acetic-acid. The vapors at the top of column 29 are passed through a dephlegmator 30, through an annexed cooler 31 and then to a decantator 32, forming therein a liquid consisting of 2 layers. The upper layer consisting of pure butyl-acetate is drawn off by conduit 34, whilst the lower layer rich in water is returned to a point near the upper end of column 29.

Other esters like amyl-acetate, hexyl-formate, ethyl-butyrate or propyl-valerate may be produced in an analogous manner.

What I claim is:

1. In the process of producing volatile organic esters, the improvement which comprises heating an esterification mixture containing an alcohol, an aliphatic monocarboxylic acid and an esterification catalyst and returning said alcohol contained in the evolving vaporous mixture of ester, alcohol and water to the esterification vessel by washing said alcohol out of said vaporous mixture by means of liquid organic acid to be esterified substantially devoid of esterification catalyst.

2. In a process for producing volatile organic esters, the improvement which comprises heating an alcohol with a lower aliphatic monocarboxylic acid and an esterification catalyst under superatmospheric pressure, and treating the vaporous mixture obtained with said acid in the liquid state devoid of esterification catalyst to wash out any unconverted alcohol as free alcohol.

3. In a process for producing volatile organic esters, the improvement which comprises heating an alcohol with a lower aliphatic monocarboxylic acid and an esterification catalyst and treating the vaporous mixture obtained with said acid in the liquid state devoid of esterification catalyst to wash out any unconverted alcohol.

4. In a process for producing volatile organic esters, the improvement which comprises heating a lower aliphatic monohydric alcohol with a lower aliphatic monocarboxylic acid and an esterification catalyst in a vessel, and treating the vaporous mixture evolved therefrom in a washing column by means of the liquid acid to be esterified devoid of esterification catalyst.

5. In a process for producing volatile organic esters, the improvement which comprises heating a mixture of an alcohol, an esterification agent and a lower aliphatic monocarboxylic acid in a proportion that shall be approximately that of the alcohol and acid values of the vapor mixture evolved by the esterification and treating the vaporous mixture obtained with said acid in the liquid state devoid of esterification catalyst to wash out any unconverted alcohol.

6. In a process for producing volatile organic esters, the improvement which comprises heating in an esterification vessel a lower aliphatic monohydric alcohol together with an aliphatic monocarboxylic acid and an esterification catalyst, feeding thereto continuously further quantities of said alcohol in a regulated manner, passing the vapors obtained into a washing column, feeding continuously and in a regulated manner to said washing column said acid in a liquid state substantially devoid of esterification catalyst in quantities equivalent to said alcohol, passing said acid in countercurrent to the ascending vapors, passing said liquid acid together with unconverted alcohol to the esterification vessel and condensing the vapors ascending in the washing column.

7. A process for producing esters containing not more than a total of 6 carbon atoms, which comprises heating an excess of an alcohol together with an aliphatic monocarboxylic acid and an esterification catalyst in a vessel, introducing into said vessel continuously further quantities of said alcohol, drawing off evolved vapors into a washing column, passing into said washing column continuously and in countercurrent to said vapors, liquid acid devoid of esterification catalyst at a rate equivalent to the alcohol fed into the reaction vessel, condensing the vapors substantially devoid of free alcohol, passing continuously from the vessel part of the liquid mixture containing water and an excess of alcohol through a dealcoholizing column to recover said alcohol and drawing off the exhausted residue.

8. In the process for producing esters containing more than a total of 6 carbon atoms, the improvement which comprises heating a mixture of an alcohol, an esterification catalyst and an aliphatic monocarboxylic acid and treating the vaporous mixture obtained with said acid in the liquid state devoid of esterification catalyst to wash out unconverted alcohol.

9. Process of producing methyl acetate comprising heating an excess of methyl-alcohol together with acetic-acid and an esterification catalyst in a vessel, introducing into said vessel continuously further quantities of methyl-alcohol drawing off the evolved vapor containing methyl acetate, methyl-alcohol and water into a washing column passing into that column continuously and in countercurrent to said vapors liquid acetic acid devoid of esterification catalyst in a rate equivalent to the methyl-alcohol fed in, condensing the vapors containing methyl-acetate free from methyl-alcohol, passing continuously from the vessel part of the liquid mixture containing water and an excess of methyl-alcohol through a dealcoholizing column to recover methyl-alcohol and drawing off the exhausted aqueous residue.

10. Process of producing ethyl-acetate comprising heating in a vessel an excess of ethyl-alcohol together with acetic acid and an esterification catalyst, introducing into said vessel continuously further quantities of ethyl-alcohol, drawing off evolved vapors, consisting of ethyl-acetate, ethyl-alcohol and water into a washing column, passing into said column continuously and in countercurrent to said vapors liquid acetic-acid devoid of esterification catalyst in a rate equivalent to the ethyl-alcohol fed in, passing continuously from the vessel part of the liquid mixture containing water and an excess of ethyl-alcohol through a dealcoholizing column to recover the ethyl-alcohol and drawing off the exhausted aqueous residue, condensing the vapors coming from the washing column to a liquid, which forms 2 layers and drawing off the upper layer which contains ethyl-acetate free from ethyl-alcohol.

11. Process of producing esters containing at least 6 carbon atoms, comprising heating in a vessel an alcohol and an aliphatic monocarboxylic acid in the presence of water in a proportion corresponding to the vaporous ternary ester-alcohol-water-mixture evolved by esterification introducing into said vessel continuously further quantities of said alcohol drawing off the evolved vapors into a washing column passing into said column continuously and in countercurrent to said vapors liquid organic acid devoid of esterification catalyst in a rate equivalent to the alcohol fed in passing said liquid acid together with free alcohol in solution back to the esterification vessel, condensing the vapors substantially devoid of free alcohol, and recovering esters thus condensed.

12. Process of producing butyl-acetate comprising heating in a vessel a butyl-alcohol, an esterification catalyst and acetic-acid in the presence of water in a proportion corresponding to the vaporous ternary ester-alcohol-water-mixture evolved by esterification introducing into said vessel continuously further quantities of said butyl-alcohol drawing off the evolved vapors into a washing column passing into that column continuously and in countercurrent to said vapors liquid acetic-acid devoid of esterification catalyst in a rate equivalent to the butyl-alcohol fed in passing that liquid acetic-acid together with free butyl-alcohol in solution back to the esterification vessel, condensing the vapors substantially devoid of free butyl-alcohol, thereby obtaining 2 layers, passing the lower layer back to the washing column and drawing off the upper layer which consists of butyl-acetate.

13. In the process of producing volatile organic esters, the improvement which comprises establishing a pool of esterification mixture containing a monohydric alcohol, an aliphatic monocarboxylic acid and an esterification catalyst, heating said pool to esterify at least a part of said alcohol and form a vapor mixture containing the thus-formed ester, water and a portion of said alcohol in an unesterified state, washing said vapor mixture with a stream of countercurrent flowing organic acid to be esterified, devoid of esterification catalyst, to absorb said unesterified alcohol, separating ester from the washed residual vapor mixture and admixing said organic acid containing unesterified alcohol with said pool of esterification mixture.

EWALD von RETZE.